(12) United States Patent
Shirai et al.

(10) Patent No.: US 6,729,759 B2
(45) Date of Patent: May 4, 2004

(54) TRACK RAIL MOUNTING STRUCTURE OF RECTILINEAR GUIDE APPARATUS

(75) Inventors: Takeki Shirai, Tokyo (JP); Hidekazu Michioka, Tokyo (JP); Genjirou Ise, Tokyo (JP); Hiroaki Kishi, Tokyo (JP)

(73) Assignee: THK Co., Ltd., Tokyo (JP)

( * ) Notice: Subject to any disclaimer, the term of this patent is extended or adjusted under 35 U.S.C. 154(b) by 43 days.

(21) Appl. No.: 10/156,639

(22) Filed: May 29, 2002

(65) Prior Publication Data

US 2003/0059135 A1 Mar. 27, 2003

(30) Foreign Application Priority Data

May 31, 2001 (JP) .......................................... 2001-164363

(51) Int. Cl.$^7$ .............................................. F16C 29/06
(52) U.S. Cl. ............................................ 384/37; 384/45
(58) Field of Search ............................ 384/37, 45, 44, 384/43

(56) References Cited

FOREIGN PATENT DOCUMENTS

| JP | 62-8430 | 2/1987 |
|---|---|---|
| JP | 63-102846 | 5/1988 |
| JP | 3-75310 | 7/1991 |

*Primary Examiner*—Lenard A. Footland
(74) *Attorney, Agent, or Firm*—Westerman, Hattori, Daniels & Adrian, LLP

(57) ABSTRACT

The present invention provides a track rail mounting structure of a rectilinear guide apparatus comprising a track rail having a rotating/running surface where a plenty of rotating/running bodies rotate and run; an endless circulation route for guiding the plenty of rotating/running bodies; and a slider movably arranged with respect to the track rail via the rotating/running bodies; wherein a base where the track rail is mounted has a groove for inserting a bottom portion of the track rail, so that the bottom portion of the track rail is inserted into the groove, and a pressure member is provided for pressing at least one side surface of the track rail toward an inner side surface of the groove.

As has been described above, since the pressure member is provided to press the side surface of the track rail toward the inner side surface of the groove, the side surface of the track rail is pressed by the pressure member so as to press the opposite side of the track rail to the inner side surface of the groove or both side surfaces of the track rail are pressed by the pressure member so as to be fixed to the track rail. Accordingly, even when a thermal expansion difference is caused between the track rail and the base by a temperature change, a contact portion of the pressure member slides along the side surface of the track rail so as to absorb the thermal expansion difference and accordingly, no distortion is caused in the track rail.

6 Claims, 11 Drawing Sheets

TRACK RAIL MOUNTING STRUCTURE OF RECTILINEAR GUIDE APPARATUS

BACKGROUND OF THE INVENTION

1. Field of the Invention

The present invention relates to a track rail mounting structure of a rectilinear guide apparatus, and more particularly, it relates to a track rail mounting structure of a rectilinear guide apparatus which can preferably be used in the case that a track rail and a base on which the track rail is mounted are made from materials having different thermal expansion coefficients.

2. Description of the Prior Art

FIG. 1 shows a constitution example of a rectilinear guide apparatus.

A rectilinear guide apparatus 1 of this type generally comprises a track rail 2 fixed to a fixing portion such as a head of a machining apparatus; and a slider 4 on which a movable member such as a table is mounted and which is engaged with the track rail 2 via a plenty of balls 3 as rotating/running members so as to perform rectilinear motion along the track rail 2.

The track rail 2 has a ball rotating/running groove 7 formed as a track where the balls 3 rotate and run, and on the other hand, the slider 4 has a ball rotating/running groove 8 formed as a load track opposing to the ball rotating/running groove 7 of the track rail 2, so that the balls 3 rotate and run between the ball rotating/running groove 7 and the ball rotating/running groove 8 while being subjected to a load.

Moreover, the slider 4 has a passage 6 formed for returning balls from one end to the other end of the ball rotating/running groove 8. This passage 6 and the aforementioned ball rotating/running groove 8 constitute an endless circulation route of the balls 3. The balls 3 circulate in this endless circulation route following the movement of the slider 4. Thus, the aforementioned slider 4 smoothly moves along the track rail 2.

When fixing to a base the track rail 2 of the rectilinear guide apparatus 1 having the aforementioned constitution, as shown in FIG. 2, a reference plane 10a is provided on the base 10, and one side surface of the track rail 2 is brought into abutment with the reference plane 10a, which is fixed to the upper surface of the base 10 with a bolt 20. Moreover, the other side surface of the track rail 2 is brought into abutment with a reinforcing member 21, which is fixed with a bolt 22.

However, as described above, when the track rail 2 is fixed to the base 10 with the bolt 20 (or a fixing member), in case the track rail 2 is made from a material having a thermal expansion coefficient different from that of a material constituting the base 10 (for example, the track rail 2 is made from iron and the base 10 is made from aluminum), a difference is caused in thermal expansion between the track rail 2 and the base 10 by a temperature change, which in turn causes distortion in the track rail 2.

Especially when arranging a plurality of rectilinear guide apparatuses 1 in parallel to one another on the base 10 and mounting a common table on their sliders 4, there is a problem that the table plane is displaced. This problem becomes especially remarkable when the rectilinear guide apparatus is used in an environment of a great temperature change.

SUMMARY OF THE INVENTION

It is therefore an object of the present invention to provide a track rail mounting structure of a rectilinear guide apparatus capable of absorbing an expansion difference between a track rail and a base caused by thermal expansion, so as not to distort the track rail by a temperature change even when the track rail of the rectilinear guide apparatus is made from a material having a thermal expansion coefficient different from that of a material constituting the base on which the track rail is mounted.

In order to achieve the aforementioned object, a track rail mounting structure of a rectilinear guide apparatus comprises a track rail having a rotating/running surface where a plenty of rotating/running bodies rotate and run; an endless circulation route for guiding the plenty of rotating/running bodies; and a slider movably arranged with respect to the track rail via the rotating/running bodies; wherein a base where the track rail is mounted has a groove for inserting a bottom portion of the track rail, so that the bottom portion of the track rail is inserted into the groove, and a pressure member is provided for pressing at least one side surface of the track rail toward an inner side surface of the groove.

As has been described above, since the pressure member is provided to press the side surface of the track rail toward the inner side surface of the groove, the side surface of the track rail is pressed by the pressure member so as to press the opposite side of the track rail to the inner side surface of the groove or both side surfaces of the track rail are pressed by the pressure member so as to be fixed to the track rail. Accordingly, even when a thermal expansion difference is caused between the track rail and the base by a temperature change, a contact portion of the pressure member slides along the side surface of the track rail so as to absorb the thermal expansion difference and accordingly, no distortion is caused in the track rail.

Moreover, the track rail mounting structure of the rectilinear guide apparatus is characterized in that the pressure member has a convex contact surface which is brought into abutment with the track rail side surface.

As has been described above, since the contact surface of the pressure member which is brought into abutment with the track rail side surface has a convex shape, the contact between the track rail side surface and the convex surface is a point-to-point contact or a linear contact. Even when a thermal expansion difference is caused between the track rail and the base by a temperature change, the convex contact portion slides along the side surface of the track rail so as to absorb the thermal expansion difference and accordingly, no distortion is caused in the track rail.

Moreover, the track rail mounting structure of the rectilinear guide apparatus is characterized in that the pressure member is an elastic corrugated spacer inserted between the side surface of the track rail and the inner side surface of the groove.

As has been described above, since the pressure member is the elastic corrugated spacer inserted between the side surface of the track rail and the inner side surface of the groove, a contact portion between the side surface of the track rail and the corrugated spacer is a linear contact. Even when a thermal expansion difference is caused between the track rail and the base, the contact portion of the corrugated spacer slides along the side surface of the track rail so as to absorb the thermal expansion difference and accordingly, no distortion is caused in the track rail.

Moreover, the track rail mounting structure of the rectilinear guide apparatus is characterized in that the pressure member is a spherical body which is inserted with pressure into a plurality of holes opened at a predetermined interval on the inner side surface of one side of the groove, so that the spherical body presses the side surface of the track rail.

As has been described above, the pressure member is a spherical body and a contact between the side surface of one side of the track rail and the spherical body is a point-to-point contact. Even when a thermal expansion difference is caused between the track rail and the base, the contact portion of the spherical body slides along the side surface of one side of the track rail so as to absorb the thermal expansion difference and accordingly, no distortion is caused in the track rail.

Moreover, the track rail mounting structure of the rectilinear guide apparatus is characterized in that a pressing force of the spherical body is reinforced by a pressing force reinforcing member inserted into the hole where the spherical body is inserted with pressure.

As has been described above, by inserting the pressing force reinforcing member with pressure into the hole where the spherical body is inserted with pressure, the pressing force of the spherical body is reinforced by the pressure member and the track rail is fixed firmly. Simultaneously with this, even when a thermal expansion difference is caused between the track rail and the base, a contact portion of the spherical body slides along the side surface of one side of the track rail so as to absorb the thermal expansion difference and accordingly, no distortion is caused in the track rail.

Moreover, the track rail mounting structure of the rectilinear guide apparatus is characterized in that the pressure member is a spherical body which is held by a holding metal member, and the metal member holding the spherical body is inserted with pressure into a plurality of holes opened at a predetermined interval on the inner side surface of the groove, so that the spherical body presses the side surface of the track rail.

As has been described above, in case the metal member holding the spherical body is inserted with pressure into a plurality of holes opened at a predetermined interval on the inner side surface of one side of the groove, so that the spherical body presses the side surface of one side of the track rail, similarly as the aforementioned, the side surface of one side of the track rail is in contact with the spherical body as a point-to-point contact. Even when a thermal expansion difference is caused between the track rail and the base, the contact portion of the spherical body slides along the side surface of one side of the track rail so as to absorb the thermal expansion difference and accordingly, no distortion is caused in the track rail.

DESCRIPTION OF THE PREFERRED EMBODIMENTS

Figure 3:
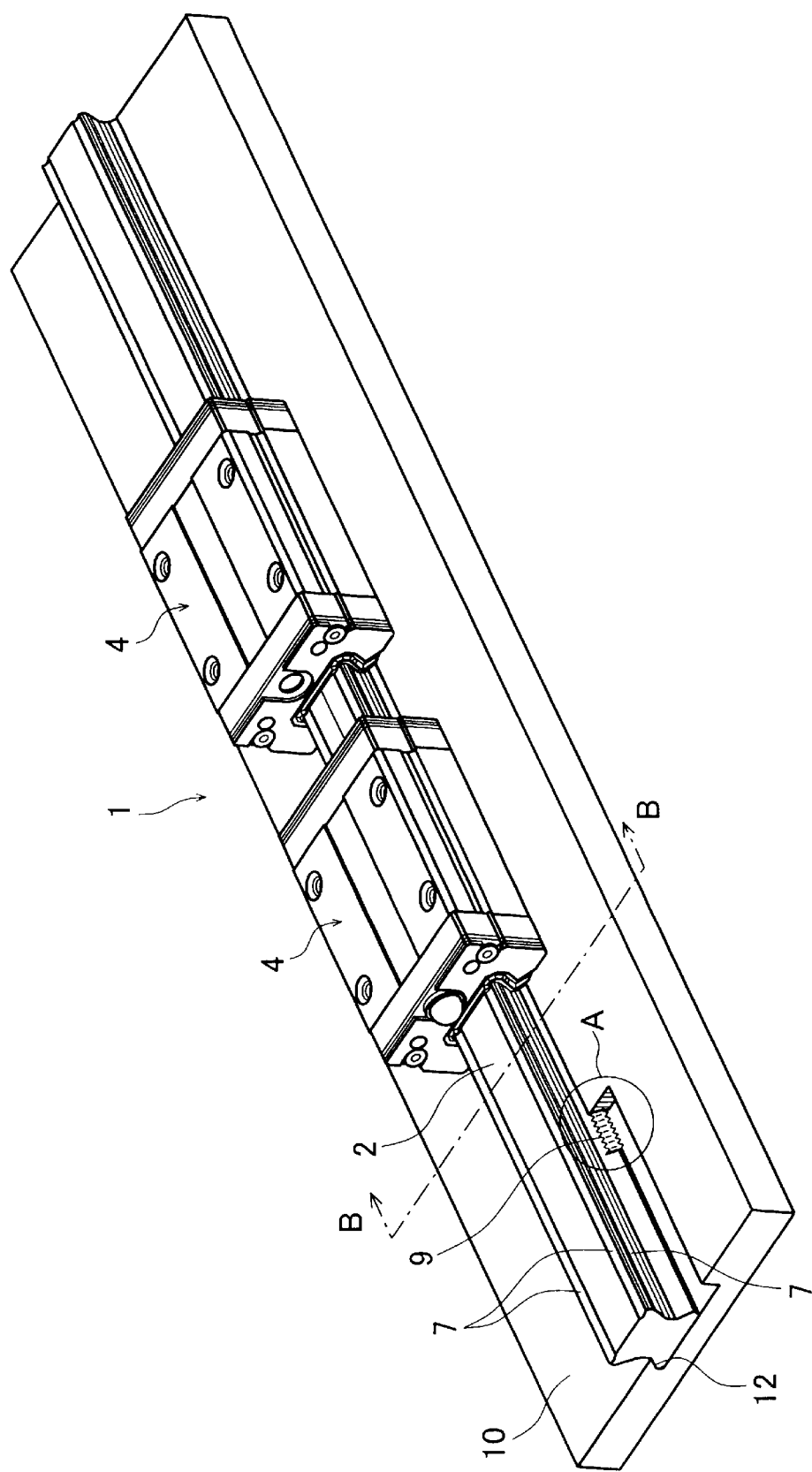
FIG. 3 shows a constitution example of a rectilinear guide apparatus having a track rail mounting structure according to the present invention.
Figure 4:
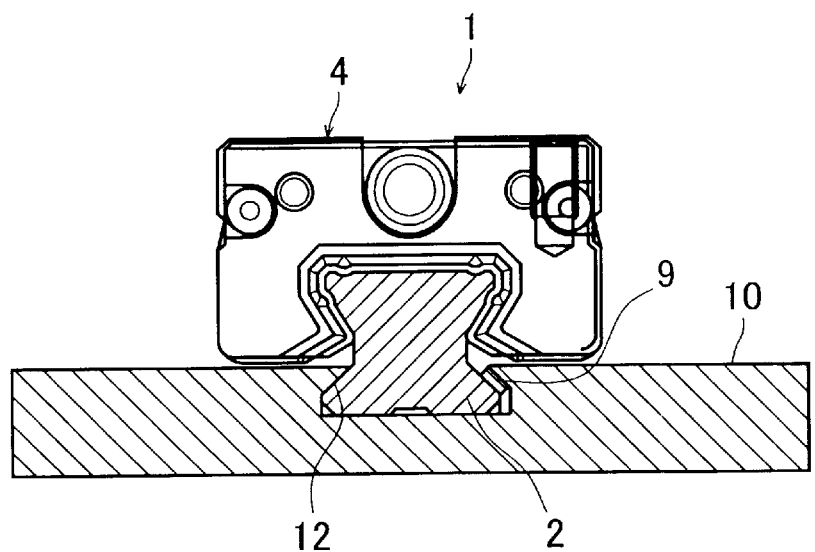
FIG. 4 is a cross sectional view about B—B of FIG. 3.
Figure 5:
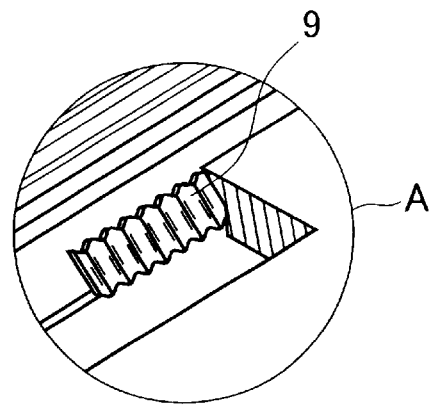
FIG. 5 is an enlarged view of a portion A of FIG. 3.
Figure 6:
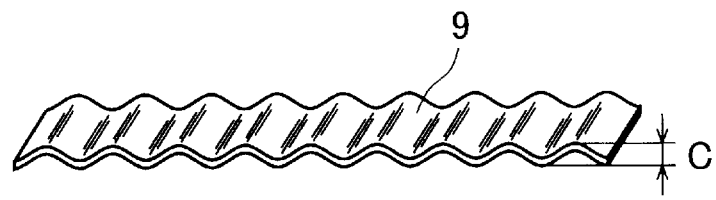
FIG. 6 shows a corrugated spacer used in the track rail mounting structure according to the present invention.

Hereinafter, explanation will be given on embodiments of the present invention with reference to the attached drawings. FIG. 3 to FIG. 6 show a constitution example of a rectilinear guide apparatus having a track rail mounting structure according to the present invention. FIG. 3 shows the entire constitution of the rectilinear guide apparatus; FIG. 4 is a cross sectional view about B—B of FIG. 3; FIG. 5 is an enlarged view of a portion A of FIG. 3; and FIG. 6 shows a corrugated spacer.

Figure 1:
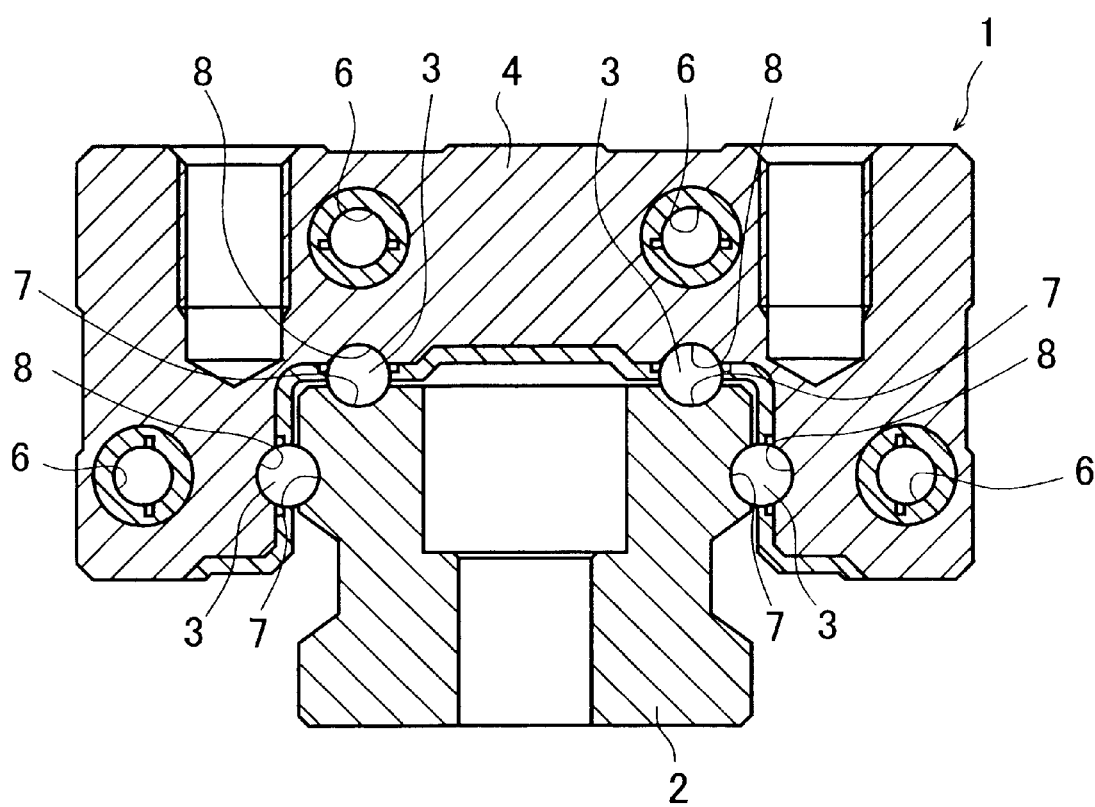
FIG. 1 shows a constitution example of a rectilinear guide apparatus.
Figure 2:
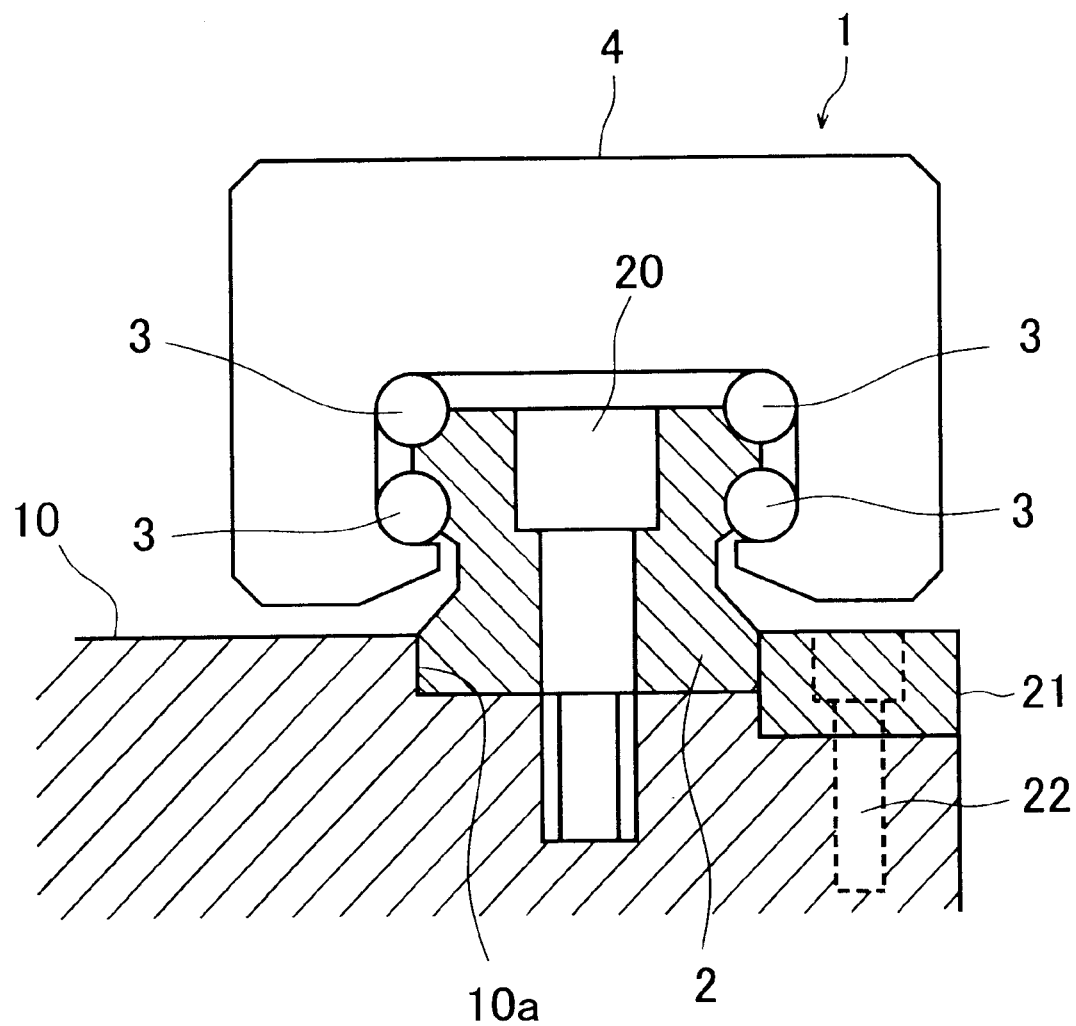
FIG. 2 is a cross sectional view showing an example of a track rail mounting structure of a conventional rectilinear guide apparatus.

In FIG. 3 to FIG. 6, like reference symbols as in FIG. 1 and FIG. 2 denote like or equivalent components. Moreover, this applies to the other drawings. In FIG. 3 and FIG. 4, a reference symbol 10 denotes a base on which a track rail 2 is mounted. The base 10 is made from a material (such as aluminum) having a different thermal expansion coefficient from that of a material (such as iron) constituting the track rail 2.

The base 10 has at its center portion a belt-shaped groove 12 in which a bottom portion of the track rail 2 is inserted. A corrugated spacer 9 is inserted between the inner side surface of the groove 12 and the side surface of the track rail 2. As shown in FIG. 6, the corrugated spacer 9 is an elastic metal material (such as a steel plate) which is made into a corrugated form.

When inserting the corrugated spacer 9 between the inner surface of the groove 12 and the side surface of the track rail 2, by pulling the corrugated spacer 9 in its longitudinal direction, the dimension C in the thickness direction is reduced. Accordingly, when the corrugated spacer 9 is in a state pulled in the longitudinal direction, the spacer 9 can easily be inserted between the inner surface of the groove 12 and the side surface of the track rail 2.

After the corrugated spacer 9 is inserted between the inner surface of the groove 12 and the side surface of the track rail 2, the pulling is released, so that the track rail 2 is pressed by an elastic force of the corrugated spacer 9 against the inner surface of the other side of the groove 12 and the track rail 2 is fixed in the groove 12.

By inserting the corrugated spacer 9 between the inner side surface of the groove 12 and the side surface of the track rail 2, a contact portion of the corrugated spacer 9 with the track rail 2 becomes linear. Even when a thermal expansion difference is caused between the track rail 2 and the base 10, the contact portion of the corrugated spacer 9 slides along the side surface of the track rail 2 and absorbs the thermal expansion difference. Accordingly, no distortion is caused in the track rail 2.

It should be noted that in the aforementioned example, explanation has been given on a case that the corrugated spacer 9 is inserted between one side surface of the track rail 2 and one inner side surface of the groove 12. However, it is also possible to insert the corrugated spacer 9 between both side surfaces of the track rail 2 and both inner side surfaces of the groove 12.

Moreover, the corrugated spacer 9 may have a length to cover the entire length of the space between the side surface of the track rail 2 and the inner side surface of the groove 12. Alternatively, it is also possible to arrange at a predetermined interval a plurality of the corrugated spacers 9 cut into a predetermined length.

Figure 7:
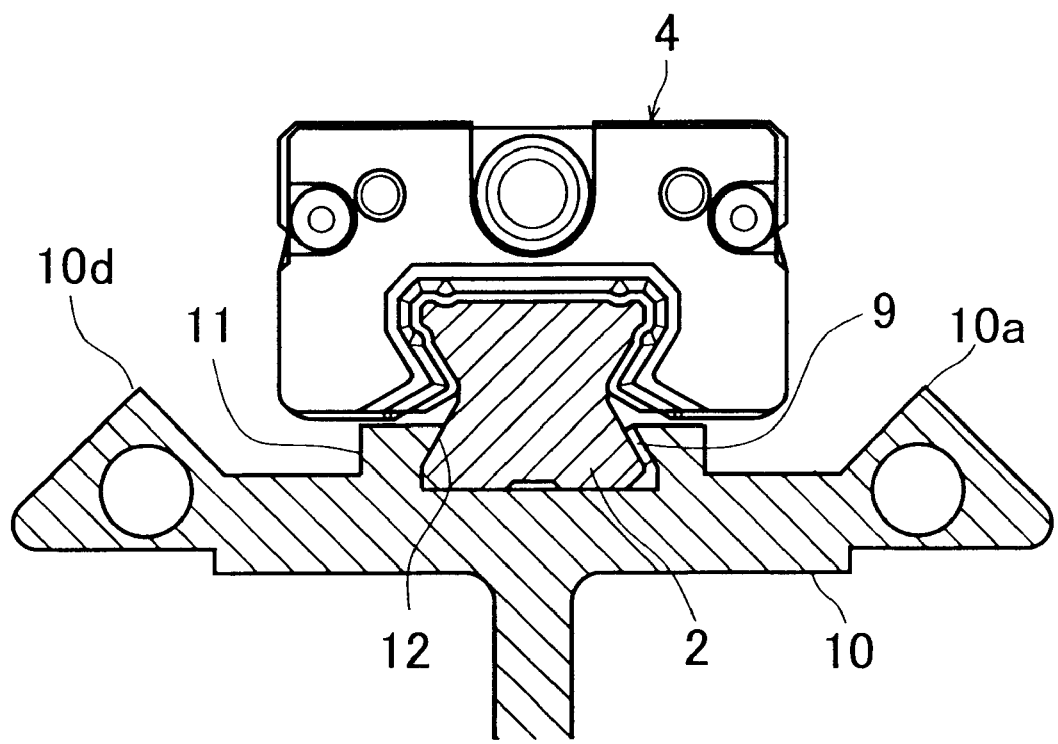
FIG. 7 is a cross sectional view showing a constitution example of the rectilinear guide apparatus having an example of the track rail mounting structure according to the present invention.

Moreover, in the aforementioned example, the base 10 has a rectangular cross sectional view and a flat upper surface. However, the cross sectional view of the base 10 is not limited to this and, as shown in FIG. 7, may have a mountain-shaped protrusion 10a at both sides and a belt-shaped convex base mounting portion at a center portion for mounting the track rail 2.

Thus, when the protrusion 10a is present at both sides of the base 10, as will be detailed later, the protrusions 10a disturb when a hole is formed to open into the inner side surface of the groove 12 and a steel ball is inserted into this hole to press the side surface of the track rail 2. Accordingly, the mounting structure that the corrugated spacer 9 is inserted into a space between the side surface of the track rail 2 and the inner side surface of the groove 12 is effective.

Figure 8:
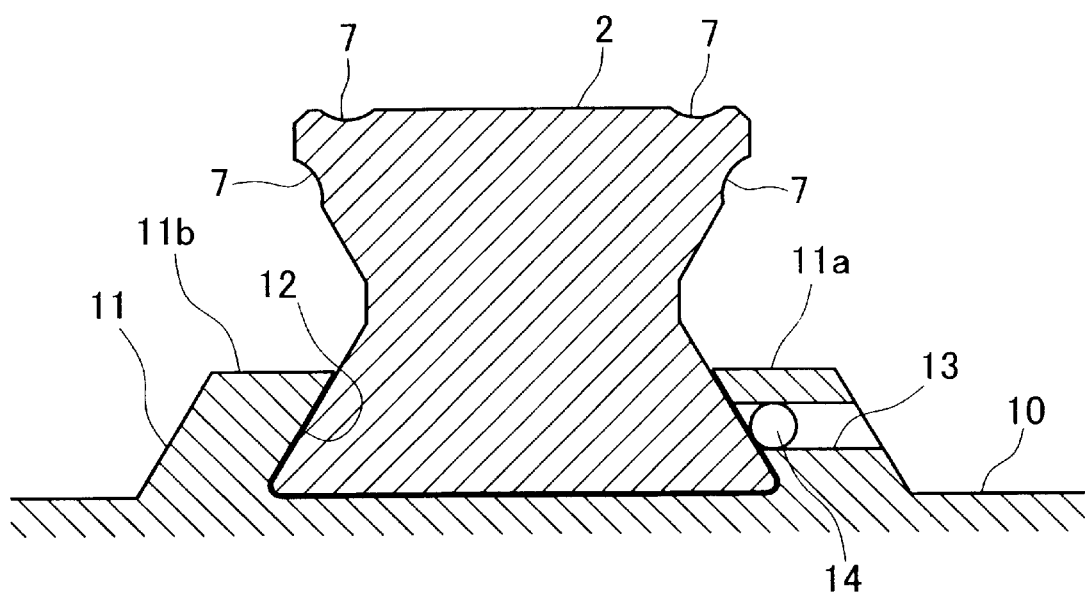
FIG. 8 is a cross sectional view (about D—D of FIG. 9) showing another example of the track rail mounting structure of the rectilinear guide apparatus according to the present invention.
Figure 9:
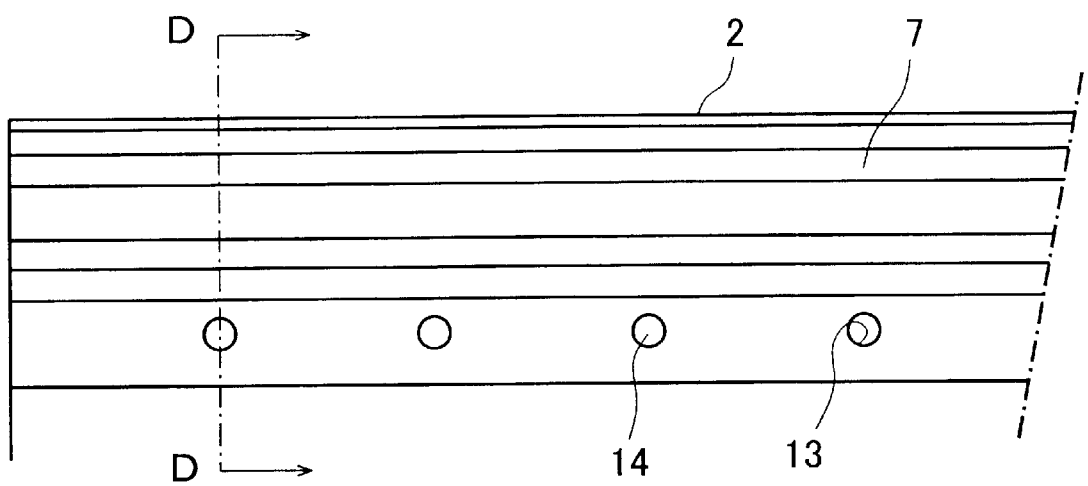
FIG. 9 is a side view showing an example of the track rail mounting structure of the rectilinear guide apparatus according to the present invention.

FIG. 8 and FIG. 9 show a constitution example of the track rail mounting structure of the rectilinear guide apparatus according to the present invention. FIG. 8 is a cross sectional view (about D—D of FIG. 9) and FIG. 9 is a side view.

In FIG. 8 and FIG. 9, like the aforementioned example, the base 10 is made from a material (for example, aluminum) having a different thermal expansion coefficient from that of a material (for example, iron) constituting the track rail 2.

The base 10 has a belt-shaped base mounting portion 11 for mounting the track rail 2. At a center portion of this base mounting portion 11, there is formed a belt-shaped groove 12 into which a bottom portion of the track rail 2 is inserted.

On a side wall portion 11a of the groove 12, at a predetermined interval, there are provided a plenty of holes 13 opening into one side surface of the groove 12 and arraigned in parallel to the upper surface of the base 10 and vertical to the one side surface. The bottom portion of the track rail 2 is inserted into the groove 12 and steel balls 14 are inserted into the holes 13 with a pressure, so as to press the one side surface of the track rail 2 in the groove 12 and to press the opposite side surface of the track rail 2 to an inner side surface of an opposite side wall portion 11b, thereby fixing the track rail 2 into the groove 12 of the base 10.

As has been described above, by inserting with pressure the steel balls 14 into the respective holes 13 formed in the side wall portion 11a of the groove 12 and pressing the side surface of the track rail 2 to the side surface of the groove 12, thereby fixing the track rail 2 to the base 10, even when a difference is caused by a temperature change, between a thermal expansion of the track rail 2 and that of the base 10 in the longitudinal direction of the track rail 2, contact portions of the steel balls 14 slide with respect to the one side surface of the track rail 2, so as to absorb the thermal expansion difference. Accordingly, no distortion is caused in the track rail 2.

Figure 10:
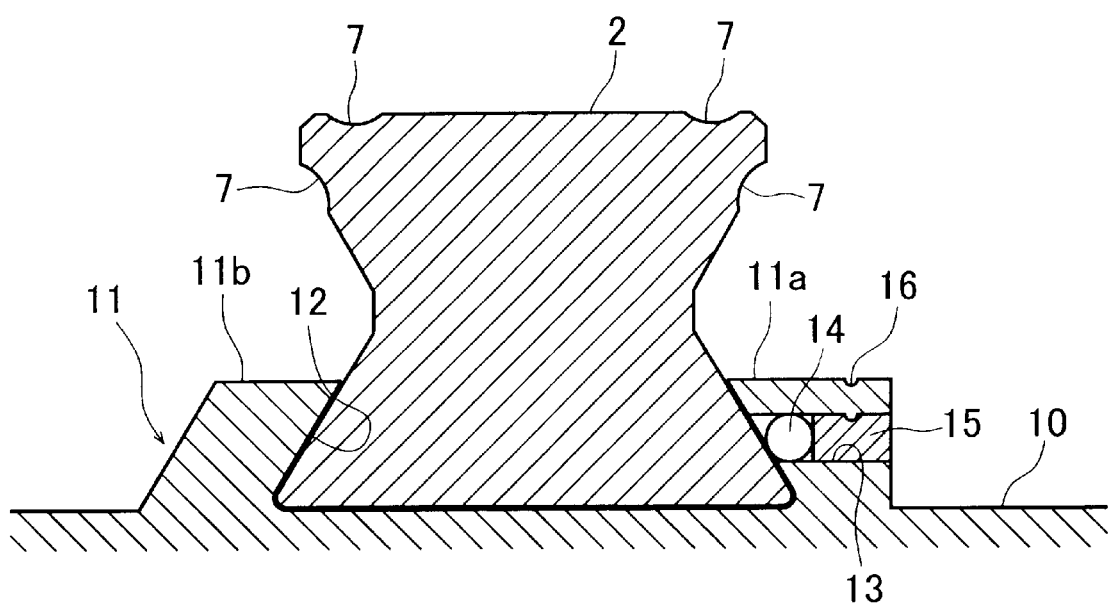
FIG. 10 is a cross sectional view showing an example of the track rail mounting structure of the rectilinear guide apparatus according to the present invention.

FIG. 10 shows another example of the track rail mounting structure of the rectilinear guide apparatus according to the present invention. This track rail mounting structure differs from the track rail mounting structure shown in FIG. 8 and FIG. 9 in that in order to reinforce a pressing force of the steel ball 14 inserted with pressure into the hole 13, a pin 15 is inserted with pressure as a pressure reinforcing member from back of the steel ball 14 and a concave portions 16 is formed by caulking on the upper surface of the side wall portion 11a at a position corresponding to the pin 15, thereby fixing the pin 15.

As has been described above, by inserting and fixing pins 15 from back of the steel balls 14, the pressing force of the steel balls 14 to press the side surface of the track rail 2 is reinforced and the mounting of the track rail 2 is reinforced. Simultaneously with this, even when a thermal expansion difference is caused between the track rail 2 and the base 10, similarly as in the track rail mounting structure of FIG. 8 and FIG. 9, the contact portions of the steel balls 14 with the one side surface of the track rail 2 slide to absorb the thermal expansion difference and no distortion is caused in the track rail 2.

Figure 11:
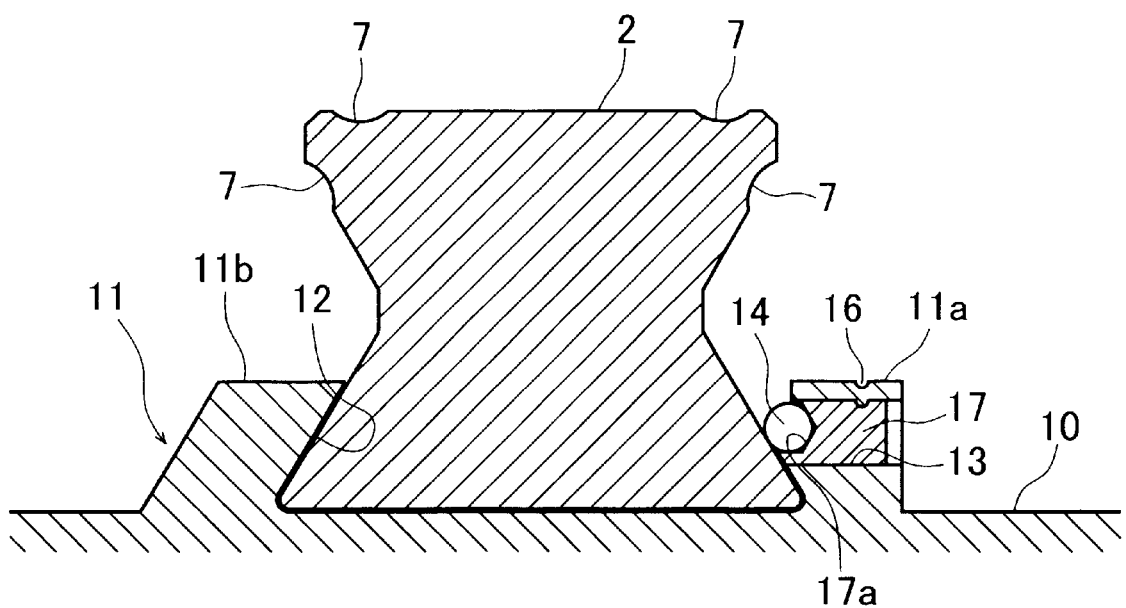
FIG. 11 is a cross sectional view showing an example of the track rail mounting structure of the rectilinear guide apparatus according to the present invention.

FIG. 11 shows still another example of the track rail mounting structure of the rectilinear guide apparatus according to the present invention. In this track rail mounting structure, instead of the pin 15 which is the pressure reinforcement member of the track rail mounting structure shown in FIG. 10, a dedicated metal member 17 is used for holding the steel ball 14. The metal member 17 holding the steel ball 14 is inserted into the hole 13 with pressure and a concave portion 16 is formed by caulking on the upper surface of the side wall portion 11a, thereby fixing the metal member 17.

The metal member 17 has a tip end where a concave portion 17a is formed to hold the steel ball 14. When the track rail mounting structure has such a constitution, it is also possible to obtain an effect approximately identical to that of the track rail mounting structure shown in FIG. 8 and FIG. 9.

Figure 12:
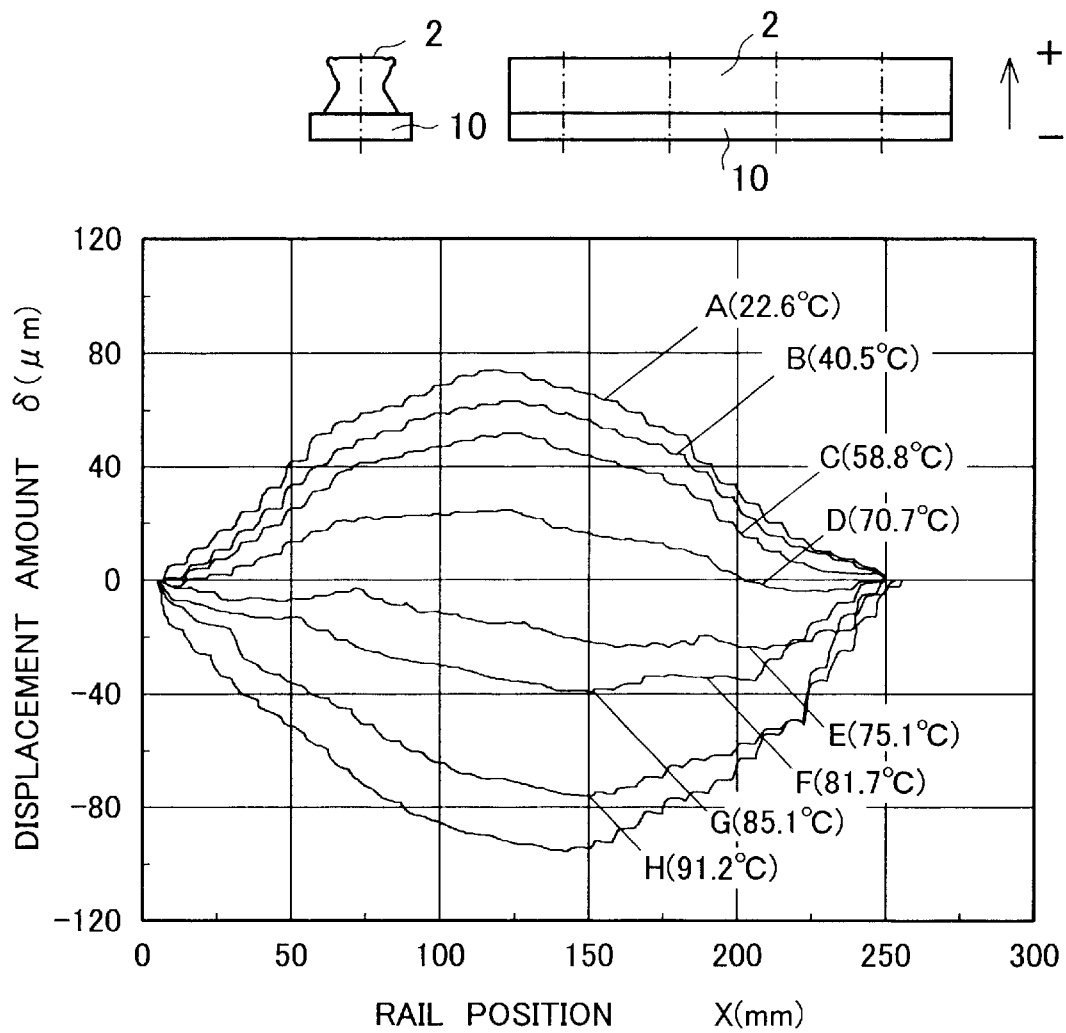
FIG. 12 shows a displacement amount of a track rail caused by a heated base of a conventional track rail mounting structure of a rectilinear guide apparatus.
Figure 13:
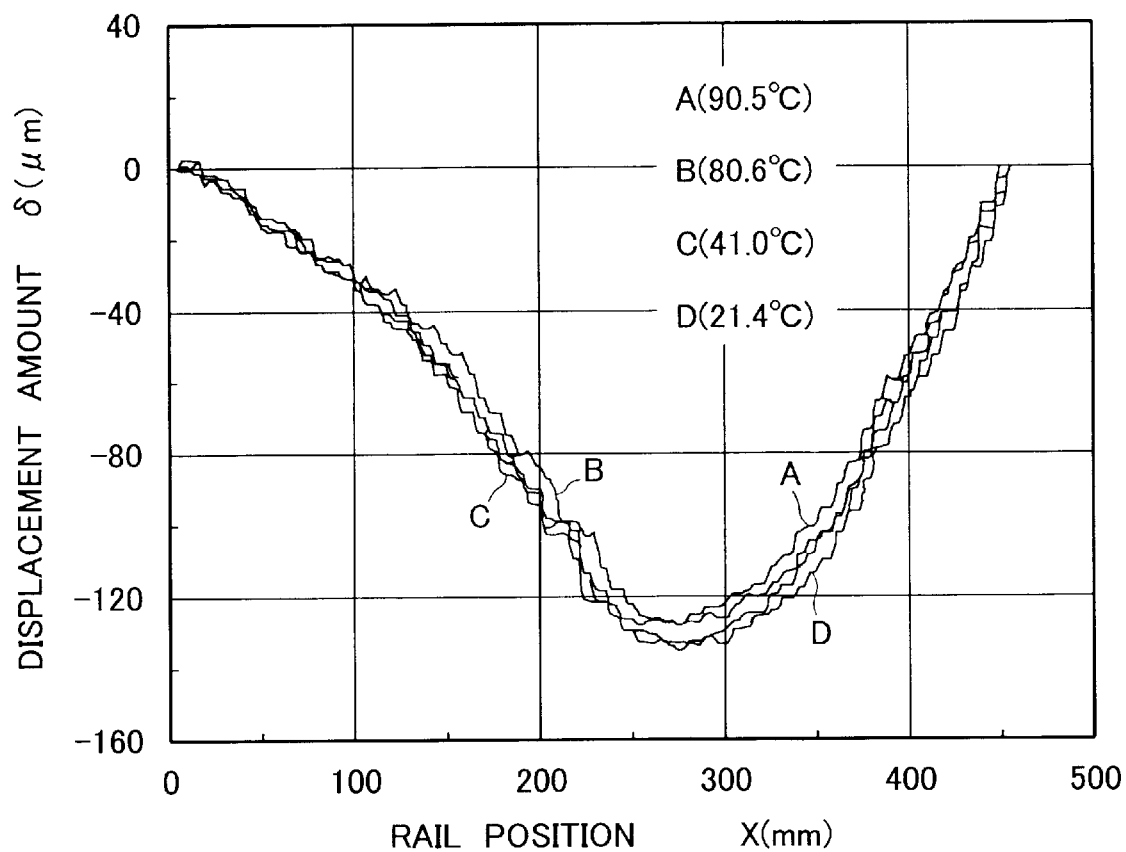
FIG. 13 shows a displacement amount of a track rail caused by a heated base of the track rail mounting structure of the rectilinear guide apparatus according to the present invention.

FIG. 12 and FIG. 13 show examples of deformation of the track rail 2 when the base 10 is heated. FIG. 12 shows a case of the conventional track rail mounting structure in which the track rail 2 is fixed to the base by bolts as shown in FIG. 2 while FIG. 13 shows a case of the track rail mounting structure according to the present invention.

In FIG. 12, curves A, B, C, D, E, F, G, and H show displacement amounts δ (μm) of the track rail (made from iron) 2 when the base (made from aluminum) 10 is heated to 22.6° C., 40.5° C., 58.8° C., 70.7° C., 75.1° C., 81,7° C., 85.1° C., and 91.2° C., respectively.

In FIG. 13, curves A, B, C, and D show displacement amounts δ (μm) of the track rail (made from iron) 2 when the base (made from aluminum) 10 is heated to 90.5° C., 80.6° C., 41.0° C., and 21.4° C., respectively.

In the conventional track rail mounting structure of FIG. 12, with respect to a displacement amount of the track rail 2 indicated by the curve A when the base temperature is 22.6° C., the displacement amount δ is greatly changed as the heating temperature is increased as shown by the curves B, C, D, E, F, G, and H while in the track rail mounting structure of FIG. 13 according to the present invention, with respect to a displacement amount of the track rail 2 indicated by the curve D when the base temperature is 21.4° C., the displacement amount δ does not change greatly when the heating temperature is increased as shown by the curves C, B, and A.

It should be noted that in the aforementioned example, the steel balls 14 are used as pressure members to press the one side surface of the track rail 2. However, the pressure member is not limited to a spherical shape but may be, for example, an arc surface or a convex surface of a paraboloid, i.e., a surface providing a point-to-point contact with the one side surface of the track rail 2.

Moreover, in the aforementioned example, explanation has been given on the track rail 2 of the rectilinear guide apparatus 1 using the balls 3 as rotating/running members. However, the rectilinear guide apparatus is not limited to this. The present invention can also be applied to a track rail mounting structure of the rectilinear guide apparatus using rolls as the rotating/running members.

According to the present invention, the pressure member is provided to press the side surface of the track rail toward the inner side surface of the groove. Accordingly, the side surface of the track rail is pressed by this pressure member so as to press the opposite side of the track rail to the inner side surface of the groove or both sides of the track rail are pressed by the pressure member so as to be fixed to the track rail. Accordingly, even when a thermal expansion difference is caused between the track rail and the base, the contact portion of the pressure member slides along the side surface of the track rail and absorbs the thermal expansion difference. Accordingly, no distortion is caused in the track rail.

Moreover, since the surface of the pressure member in contact with the track rail side surface is a convex surface, the track rail side surface and the convex surface are in contact with each other as a point-to-point contact or a linear contact. Accordingly, even when a thermal expansion difference is caused between the track rail and the base, the contact portion of the convex shape slides along the side surface of the track rail so as to absorb the thermal expansion difference and no distortion is caused in the track rail.

Moreover, since the pressure member inserted between the side surface of the track rail and the inner side surface of the groove is the elastic corrugated spacer, the contact portion between the side surface of the track rail and the corrugated spacer is a linear contact. Accordingly, even when a thermal expansion difference is caused between the track rail and the base, the contact portion of the corrugated spacer slides along the side surface of the track rail so as to absorb the thermal expansion difference and accordingly, no distortion is caused in the track rail.

Moreover, when the pressure member is a spherical body, the contact between the one side surface of the track rail and the spherical body is a point-to-point contact. Accordingly, even when a thermal expansion difference is caused between the track rail and the base, the contact portion of the spherical body slides along the one side surface of the track rail so as to absorb the thermal expansion difference and accordingly, no distortion is caused in the track rail.

Moreover, by inserting the pressure reinforcement member with pressure into the hole where the spherical body is inserted with pressure, the pressing force of the spherical body is reinforced by the pressure member and the track rail is fixed firmly. Simultaneously with this, even when a thermal expansion difference is caused between the track rail and the base, the contact portion of the spherical body slides along one side surface of the track rail so as to absorb the thermal expansion difference and accordingly, no distortion is caused in the track rail.

Moreover, a metal member holding a spherical body may be inserted with pressure into a plurality of holes opened at a predetermined interval on the inner surface of one side of the groove, so as to press one side surface of the track rail. In this case also, like in the invention claimed in claim 4, one side surface of the track rail is in contact with the spherical body to make a point-to-point contact. Even when a thermal expansion difference is caused between the track rail and the base, the contact portion of the spherical body slides along the one side surface of the track rail so as to absorb the thermal expansion difference and accordingly, no distortion is caused in the track rail.

What we claim is:

1. A track rail mounting structure of a rectilinear guide apparatus comprising a track rail having a rotating/running surface where a plenty of rotating/running bodies rotate and run; an endless circulation route for guiding the plenty of rotating/running bodies; and a slider movably arranged with respect to the track rail via the rotating/running bodies;

wherein a base where the track rail is mounted has a groove for inserting a bottom portion of the track rail, so that the bottom portion of the track rail is inserted into the groove and a pressure member is provided for pressing at least one side of track rail toward an inner side surface of the groove.

2. The track rail mounting structure of the rectilinear guide apparatus according to claim 1, wherein the pressure member has a convex contact surface which is brought into abutment with the track rail side surface.

3. The track rail mounting structure of the rectilinear guide apparatus according to claim 1, wherein the pressure member is an elastic corrugated spacer inserted between the side surface of the track rail and the inner side surface of the groove.

4. The track rail mounting structure of the rectilinear guide apparatus according to claim 1, wherein the pressure member is a spherical body which is inserted with pressure into a plurality of holes opened at a predetermined interval on the inner side surface of one side of the groove, so that the spherical body presses the side surface of the track rail.

5. The track rail mounting structure of the rectilinear guide apparatus according to claim 4, wherein a pressing force of the spherical body is reinforced by a pressing force reinforcing member inserted into the hole where the spherical body is inserted with pressure.

6. The track rail mounting structure of the rectilinear guide apparatus according to claim 1, wherein the pressure member is a spherical body which is held by a holding metal member, and the metal member holding the spherical body is inserted with pressure into a plurality of holes opened at a predetermined interval on the inner side surface of the groove, so that the spherical body presses the side surface of the track rail.

\* \* \* \* \*